US012631538B2

(12) United States Patent
Tsai et al.

(10) Patent No.: US 12,631,538 B2
(45) Date of Patent: May 19, 2026

(54) LIGHT SCATTERING MEASUREMENT BASED ON MULTIPLE LIGHT SOURCES

(71) Applicant: Texas Instruments Incorporated, Dallas, TX (US)

(72) Inventors: Kaichien Tsai, Allen, TX (US); Boyu Shen, McKinney, TX (US); Zhongyan Sheng, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 54 days.

(21) Appl. No.: 18/343,423

(22) Filed: Jun. 28, 2023

(65) Prior Publication Data

US 2025/0003853 A1     Jan. 2, 2025

(51) Int. Cl.
*G01N 15/02*     (2024.01)
*G01N 15/0205*     (2024.01)
*G01N 15/06*     (2006.01)
*G01N 15/075*     (2024.01)

(52) U.S. Cl.
CPC ......... *G01N 15/0205* (2013.01); *G01N 15/06* (2013.01); *G01N 15/075* (2024.01)

(58) Field of Classification Search
CPC .. G01N 15/0205; G01N 15/06; G01N 15/075; G01N 15/1459; G01N 2015/0046
See application file for complete search history.

(56) References Cited

U.S. PATENT DOCUMENTS

| | | | |
|---|---|---|---|
| 12,223,815 B2 * | 2/2025 | Hlushchenko | ....... G08B 17/107 |
| 2023/0206742 A1 * | 6/2023 | Yang | ....................... G01N 15/06 |
| | | | 340/630 |

FOREIGN PATENT DOCUMENTS

| | | | |
|---|---|---|---|
| CN | 115273382 | * | 11/2022 |
| CN | 115273382 A | * | 11/2022 |

OTHER PUBLICATIONS

Livio Lattanzio "Particulate Matter Sensing for Air Quality Measurements" https://sensirion.com/products/product-insights/specialist-articles/particulate-matter-sensing-for-air-quality-measurements/, article printed Jun. 28, 2023 (8 pages).

* cited by examiner

*Primary Examiner* — Tony Ko
(74) *Attorney, Agent, or Firm* — Zhenhai Fu; Frank D. Cimino

(57)     ABSTRACT
Techniques are described herein for air quality sensing. In some examples, the techniques are implemented as an apparatus including first and second light sources, a light detector having a detector output, and a processing circuit having a processing input coupled to the detector output and a processing output. The first light source is configured to generate a first light signal having a first wavelength. The second light source is configured to generate a second light signal having a second wavelength different from the first wavelength. The light detector is configured to generate a first detection signal at the detector output responsive to the first light signal and a second detection signal at the detector output responsive to the second light signal. The processing circuit is configured to generate a third signal representative of an air quality measurement at the processing output responsive to the first and second detection signals.

21 Claims, 7 Drawing Sheets

PROCESSING CIRCUIT
180

PARTICLE SIZE
ESTIMATION MODULE
200

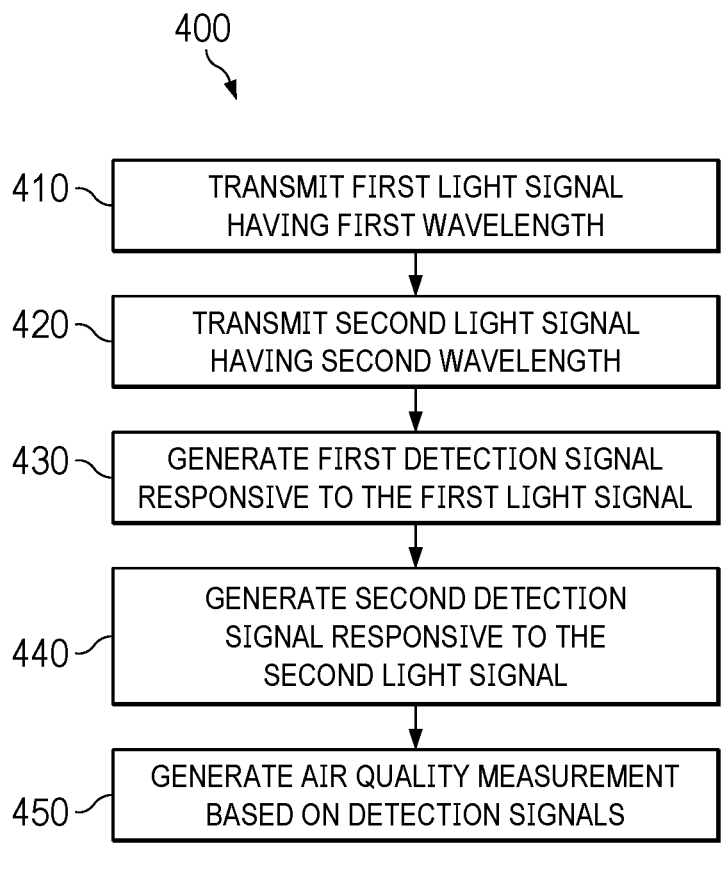

400

410 — TRANSMIT FIRST LIGHT SIGNAL HAVING FIRST WAVELENGTH

420 — TRANSMIT SECOND LIGHT SIGNAL HAVING SECOND WAVELENGTH

430 — GENERATE FIRST DETECTION SIGNAL RESPONSIVE TO THE FIRST LIGHT SIGNAL

440 — GENERATE SECOND DETECTION SIGNAL RESPONSIVE TO THE SECOND LIGHT SIGNAL

450 — GENERATE AIR QUALITY MEASUREMENT BASED ON DETECTION SIGNALS

FIG. 4

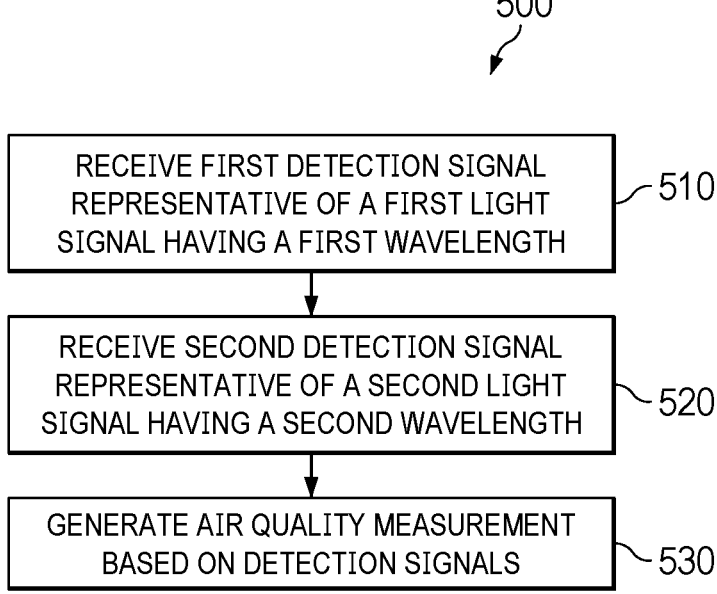

500

RECEIVE FIRST DETECTION SIGNAL REPRESENTATIVE OF A FIRST LIGHT SIGNAL HAVING A FIRST WAVELENGTH — 510

RECEIVE SECOND DETECTION SIGNAL REPRESENTATIVE OF A SECOND LIGHT SIGNAL HAVING A SECOND WAVELENGTH — 520

GENERATE AIR QUALITY MEASUREMENT BASED ON DETECTION SIGNALS — 530

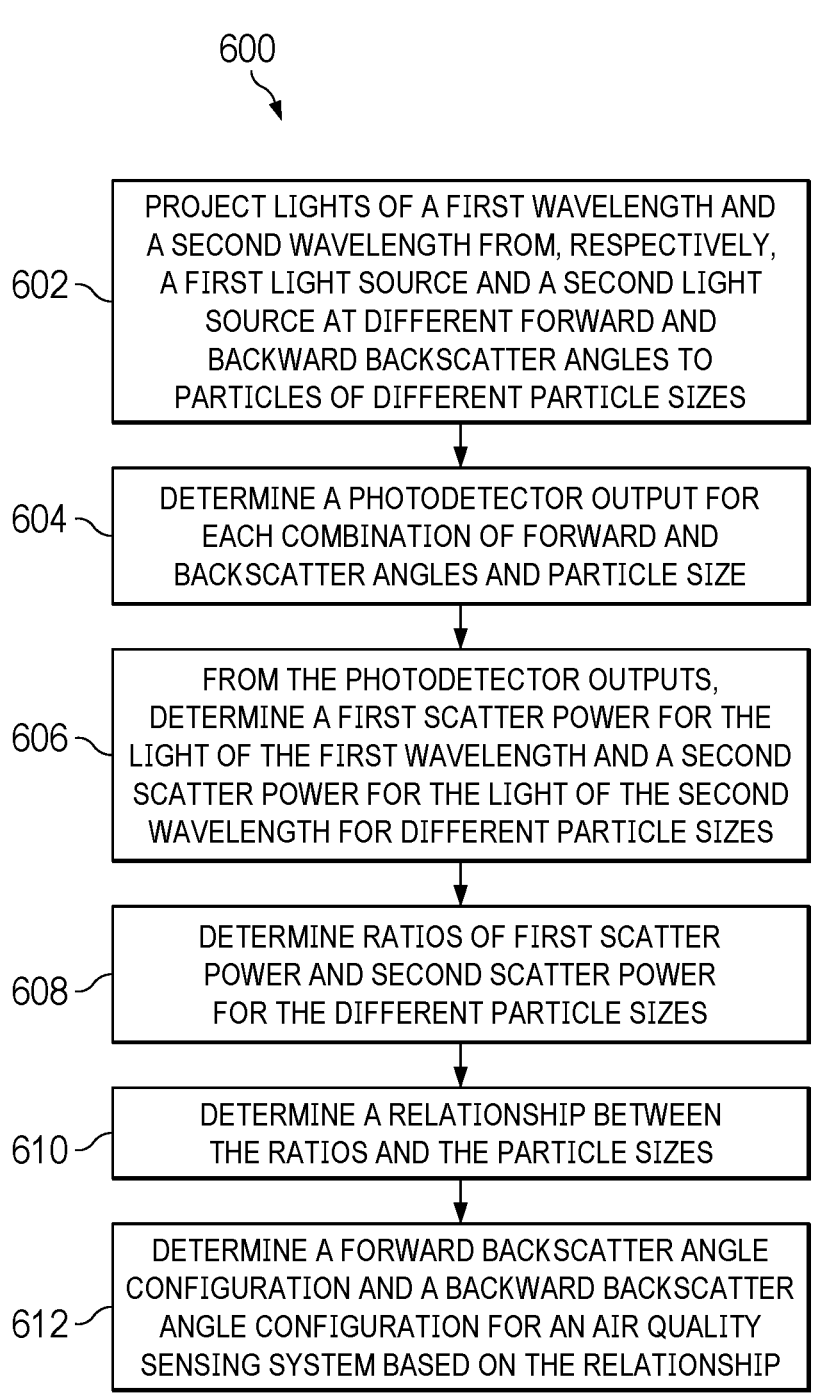

602 — PROJECT LIGHTS OF A FIRST WAVELENGTH AND A SECOND WAVELENGTH FROM, RESPECTIVELY, A FIRST LIGHT SOURCE AND A SECOND LIGHT SOURCE AT DIFFERENT FORWARD AND BACKWARD BACKSCATTER ANGLES TO PARTICLES OF DIFFERENT PARTICLE SIZES

604 — DETERMINE A PHOTODETECTOR OUTPUT FOR EACH COMBINATION OF FORWARD AND BACKSCATTER ANGLES AND PARTICLE SIZE

606 — FROM THE PHOTODETECTOR OUTPUTS, DETERMINE A FIRST SCATTER POWER FOR THE LIGHT OF THE FIRST WAVELENGTH AND A SECOND SCATTER POWER FOR THE LIGHT OF THE SECOND WAVELENGTH FOR DIFFERENT PARTICLE SIZES

608 — DETERMINE RATIOS OF FIRST SCATTER POWER AND SECOND SCATTER POWER FOR THE DIFFERENT PARTICLE SIZES

610 — DETERMINE A RELATIONSHIP BETWEEN THE RATIOS AND THE PARTICLE SIZES

612 — DETERMINE A FORWARD BACKSCATTER ANGLE CONFIGURATION AND A BACKWARD BACKSCATTER ANGLE CONFIGURATION FOR AN AIR QUALITY SENSING SYSTEM BASED ON THE RELATIONSHIP

FIG. 6

LIGHT SCATTERING MEASUREMENT BASED ON MULTIPLE LIGHT SOURCES

BACKGROUND

Light scattering can occur when light propagates through particles (e.g., smoke particles) in a space and scattered by the particles in the space. A light scattering measurement device can emit light into the space, and sense the light that propagates through the space to measure the scattering of light (if any). Based on the measurement, the presence of certain particles of interest in the space can be detected.

SUMMARY

In some examples, an apparatus includes a first light source, a second light source, a light detector having a detector output, and a processing circuit having a processing input and a processing output, the processing input coupled to the detector output. The first light source is configured to generate a first light signal having a first wavelength. The second light source is configured to generate a second light signal having a second wavelength, the second wavelength different from the first wavelength. The light detector is configured to generate a first detection signal at the detector output responsive to the first light signal and generate a second detection signal at the detector output responsive to the second light signal. The processing circuit is configured to generate a third signal representative of an air quality measurement at the processing output responsive to the first and second detection signals.

In some examples, a method includes transmitting, with a first light source, a first light signal having a first wavelength. The method also includes transmitting, with a second light source, a second light signal having a second wavelength different from the first wavelength. The method further includes generating, by a light detector, a first detection signal responsive to the first light signal. The method further includes generating, by the light detector, a second detection signal responsive to the second light signal. The method further includes generating, by a processing circuit, a third signal representative of an air quality measurement responsive to the first and second detection signals.

In some examples, a computer readable medium comprises computer-executable instructions. The instructions are executable by a processor to cause the processor to be configured to receive a first detection signal, the first detection signal representing detection of a first light signal having a first wavelength; receive a second detection signal, the second detection signal representing detection of a second light signal having a second wavelength; and generate a third signal representative of an air quality measurement at the processing output responsive to the first and second detection signals.

BRIEF DESCRIPTION OF THE DRAWINGS

FIG. 4 is a flow diagram of an air quality measurement method, in accordance with various examples.

FIG. 5 is a flow diagram of another air quality measurement method, in accordance with various examples.

FIG. 6 is a flow diagram of a simulation process for angle configuration optimization, in accordance with various examples.

In this description, the same reference numbers depict same or similar (by function and/or structure) features. The drawings are not necessarily drawn to scale.

DETAILED DESCRIPTION

Figure 1:
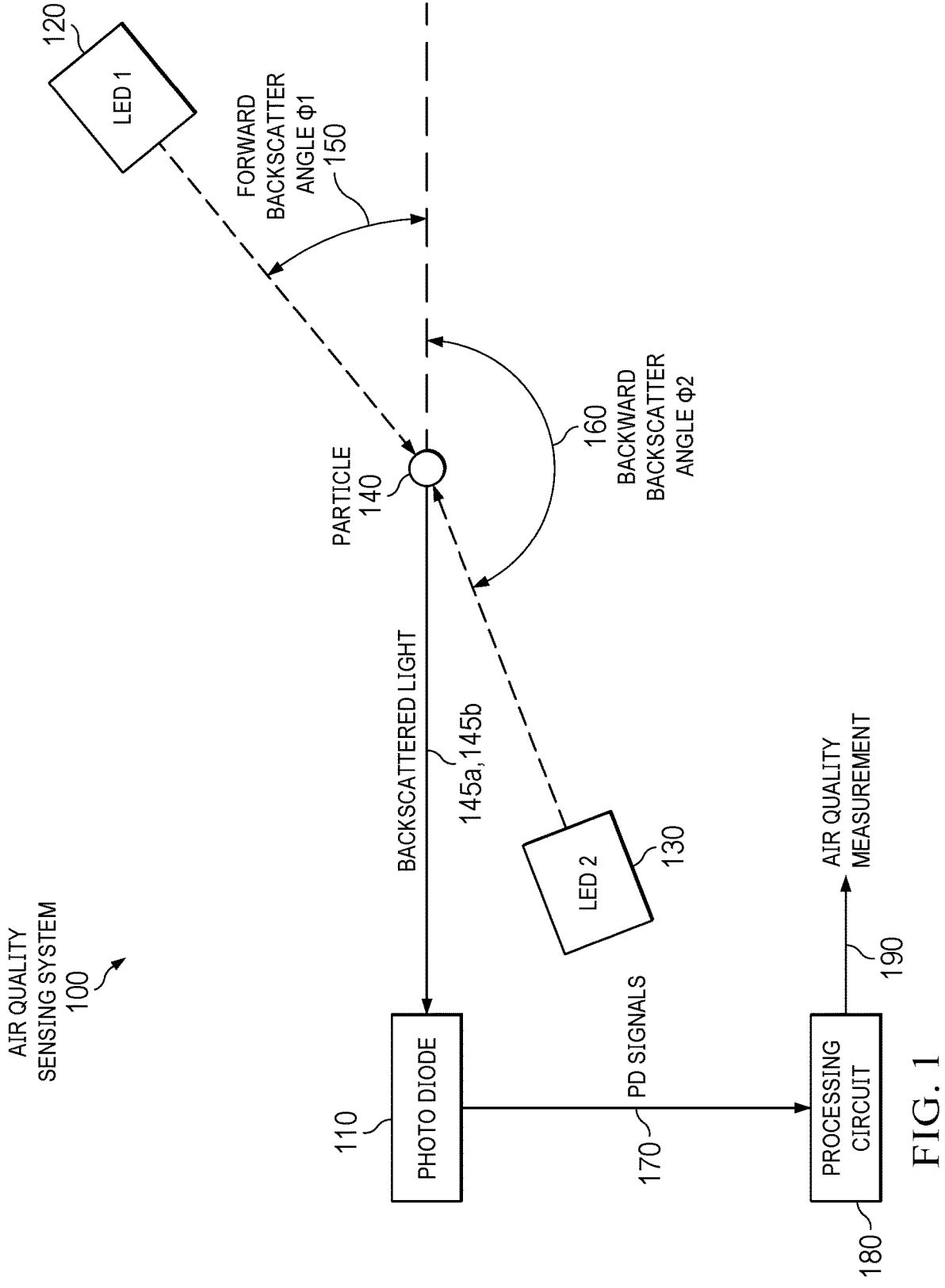
FIG. 1 is a block diagram of an air quality sensing system, in accordance with various examples.

Techniques are described herein for air quality sensing. In an example, the techniques are implemented as an apparatus configured for sensing air quality. The apparatus may be, for instance, a smoke detector or other air quality sensor. In some examples, the apparatus includes a first light source, a second light source, a light detector having a detector output, and a processing circuit having a processing input and a processing output, the processing input coupled to the detector output. The first light source is configured to generate a first light signal having a first wavelength. The second light source is configured to generate a second light signal having a second wavelength, the second wavelength different from the first wavelength. The light detector is configured to generate a first detection signal at the detector output responsive to the first light signal and generate a second detection signal at the detector output responsive to the second light signal. The processing circuit is configured to generate a third signal representative of an air quality measurement at the processing output responsive to the first and second detection signals.

As described above, a light scattering measurement device emits light into a space, and senses the light that propagates through the space to measure the scattering of light (if any). Based on the measurement, the presence of certain particles of interest in the space can be detected. For example, a smoke detector may transmit light from an LED, which is reflected or scattered by the smoke particles, and then detected by a photodiode. If the received signal provided by the photodiode exceeds a suitable threshold, a smoke detection alert may be generated. These devices do not provide any indication of air quality such as particle size and mass concentration.

As to be described herein, an example of an air quality sensing system can include multiple light sources to provide light scattering measurements, which can be further processed to provide particle size and mass concentration information. In some examples, an air quality sensing system can include two light sources operating at different wavelengths and oriented to provide pre-configured scattering angles. Lights emitted by the two light sources can reflect off particles of interest (e.g., smoke particles) as part of backscattering, and the ratio of the intensities of the two backscattered light signals can exhibit a monotonic trend as a function of average particle size of the particles. This monotonic trend can be used to estimate the particle size, and particle concentration, as described herein. Additionally, techniques for determining suitable wavelengths and orientations of the light sources will also be disclosed.

The described techniques allow using the optical hardware resources of a smoke detector that support light scattering measurements, such as LEDs and photodiodes, to support air quality measurements. Such arrangements allow an air quality sensor to use similar optical hardware resources as a smoke detector, which can reduce the hardware complexity and cost of the air quality sensor.

FIG. 1 is a block diagram of an air quality sensing system 100, in accordance with various examples. The air quality sensing system 100 includes a processing circuit 180, two light sources 120 and 130, and a light detector 110. The processing circuit 180 has a processing input and a processing output. The processing input is coupled to the light detector 110. In an example, the processing output is coupled to a device (not shown) to which the air quality sensing system 100 provides an air quality measurement. The processing circuit 180 may be any suitable circuit or component capable of performing processing and/or control, such as a processer, microprocessor, controller, microcontroller unit (MCU), field-programmable gate array (FPGA), or any other combination of analog and/or digital components arranged in an architecture that provides processing and control capabilities.

In some examples, the light sources 120 and 130 are light emitting diodes (LEDs) configured to generate light signals having a first wavelength and a second wavelength, respectively, the second wavelength different from the first wavelength. In some examples, the first wavelength is in an infrared spectral region and the second wavelength is in a blue spectral region. In other examples, the light sources 120 and 130 may be any other suitable source of light other than an LED. In some examples, the light detector 110 includes a photodiode. In other examples, the light detector 110 is any device capable of providing an output signal responsive to a detection of light.

In an example operation, light sources 120 and 130 emit light signals that are scattered or reflected by particles such as particle 140 (e.g., a smoke particle, a pollutant, or any scattering agent of interest). Light from the first light source 120, at the first wavelength, is shown to scatter at a forward (e.g., less than 90 degrees) backscatter angle $\Phi_1$ (also labelled angle 150), as backscattered light signal 145a. Light from the second light source 130, at the second wavelength, is shown to scatter at a backward (e.g., greater than 90 degrees) backscatter angle $\Phi_2$ (also labelled angle 160), as backscattered light signal 145b. In some examples, the first light source 120 is oriented to generate the first light signal at a forward backscatter angle $\Phi_1$ in the range of 50 to 60 degrees, and the second light source is oriented to generate the second light signal at a backward backscatter angle $\Phi_2$ in the range of 145 to 155 degrees.

Some or all of the backscattered light 145a and 145b from both light sources can be detected by light detector 110. Light detector 110 outputs detection signals 170 representative of the detected backscattered light signal 145a from the first light source and detected backscattered light signal 145b from the second light source. The detection signals 170 are provided to processing circuit 180 (e.g., through a processing input). Processing circuit 180 can generate an air quality measurement 190 (e.g., at a processing output) which may include the sizes of the particles and/or the mass concentration of the particles. In some examples, air quality measurement may also include an indication of smoke detection. In some examples, particle sizes of interest, for the purpose of air quality measurement and smoke detection, may range from approximately 300 nanometers (nm) to 10 micrometers (µm). Computation of the particle size and mass concentration can be based on a ratio between the intensity of detected backscattered light signal 145a and the intensity of backscattered light signal 145b, as will be described below.

In some examples, air quality sensing system 100 may include a chamber that houses light sources 120 and 130 and light detector 110. The chamber can block ambient light outside the chamber from reaching light detector 110, while allowing particles to enter into the chamber through an opening of the chamber and scatter the light emitted by light sources 120 and 130. The ambient light may have an intensity that varies with time and, if received by light detector 110, can introduce an interference component in the detection signal 170. By blocking the ambient light from reaching light detector 110, the interference component can be reduced, which can improve the accuracy of the detection/measurement operation.

In some examples, air quality sensing system 100 may operate in a chamberless arrangement, or a partial chamberless arrangement, in which light detector 110 is exposed to more ambient light than in a case where light detector 110 is housed inside the chamber. The chamberless (or partial chamberless) arrangements facilitate movement of particles into the space between light sources 120 and 130 and light detector 110, including particles of low momentum that may otherwise be blocked by a chamber, and improve the sensitivity of air quality sensing system 100 in detecting/ measuring such particles. The chamberless (or partial chamberless) arrangements may also reduce the manufacturing complexity and cost of air quality sensing system 100.

Figure 2:
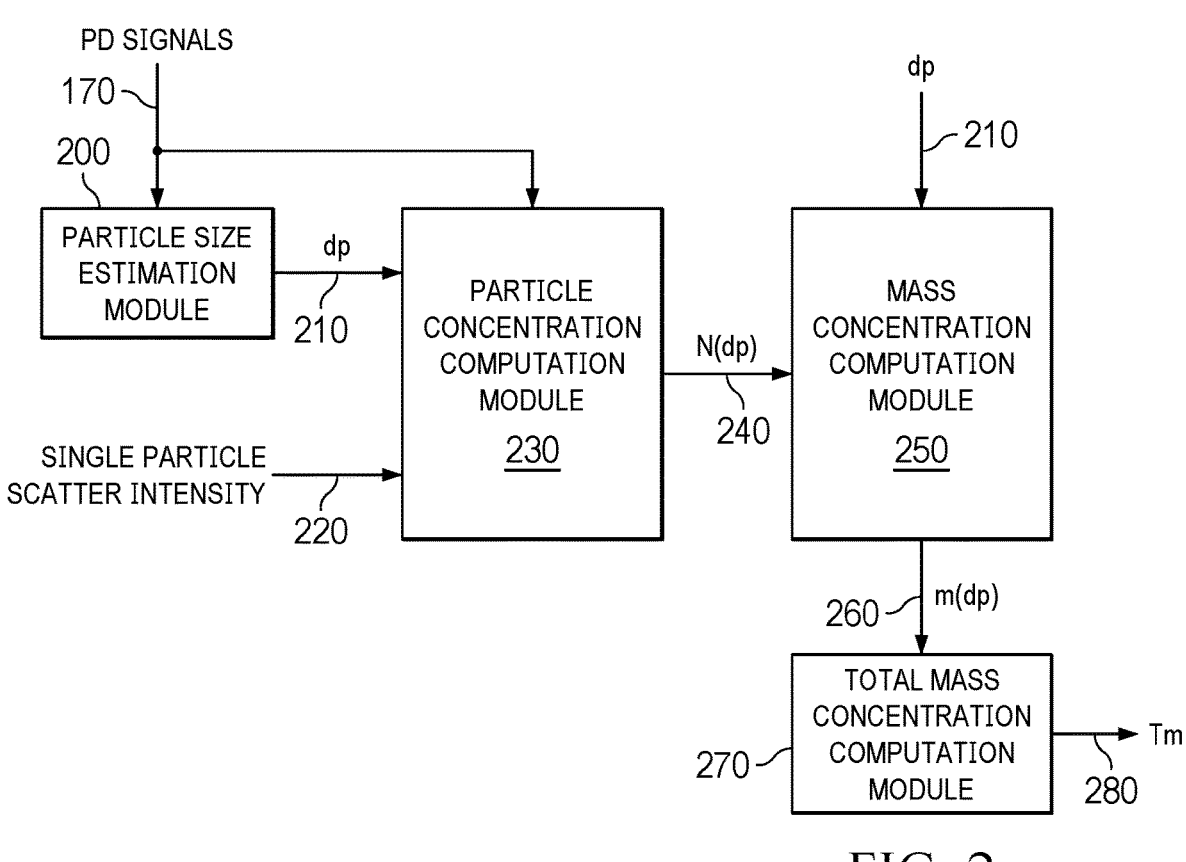
FIG. 2 is a block diagram of a processing circuit of the air quality sensing system, in accordance with various examples.

FIG. 2 is a block diagram of a processing circuit 180 of the air quality sensing system 100, in accordance with various examples. The processing circuit 180 is shown to include a particle size estimation module 200, a particle concentration computation module 230, a mass concentration module 250, and a total mass concentration module 270. Each of these modules can be a circuit module or a software module.

Particle size estimation module 200 is configured to compute a ratio R between the power or intensity ($I_0$) of detected backscattered light 145a and the power or intensity ($I_1$) of detected backscattered light 145b. The average size of the particles 210, or average particle diameters $d_p$, is then estimated as a function of R, as explained below in connection with FIG. 3.

Particle concentration computation module 230 is configured to compute the particle concentration $N(d_p)$ (also labelled 240 in FIG. 2) of the particles. For example, $N(d_p)$ may represent the number of particles of average size $d_p$ per cubic meter. $N(d_p)$ is computed based on a ratio of the total intensity of backscattered light received by light detector 110 (which can be represented by $I_0+I_1$) to the expected scatter power or intensity 220 of a single particle having the diameter $d_p$. In some examples, the expected scatter power or intensity 220, based on one or both of the light sources, may be obtained from simulation or experiment.

Mass concentration module 250 is configured to compute the mass concentration $m(d_p)$ 260 of the particles of average size $d_p$. For example, $m(d_p)$ may represent the mass in micrograms of the particles per cubic meter. The mass concentration $m(d_p)$ is computed based on the particle concentration $N(d_p)$, the volume of the particle $v_p$, and the density of the particle $p_p$. The volume $v_p$ is computed as $$\frac{\pi}{6}d_p^3.$$

The density $p_p$ may be obtained through calibration or other suitable means. Thus, an approximation of the mass concentration 260 may be computed as a function of the average particle size:

$$m(d_p) = N(d_p) * \frac{\pi}{6} d_p^3 * \rho_p \qquad \text{(Equation 1)}$$

Figure 3:
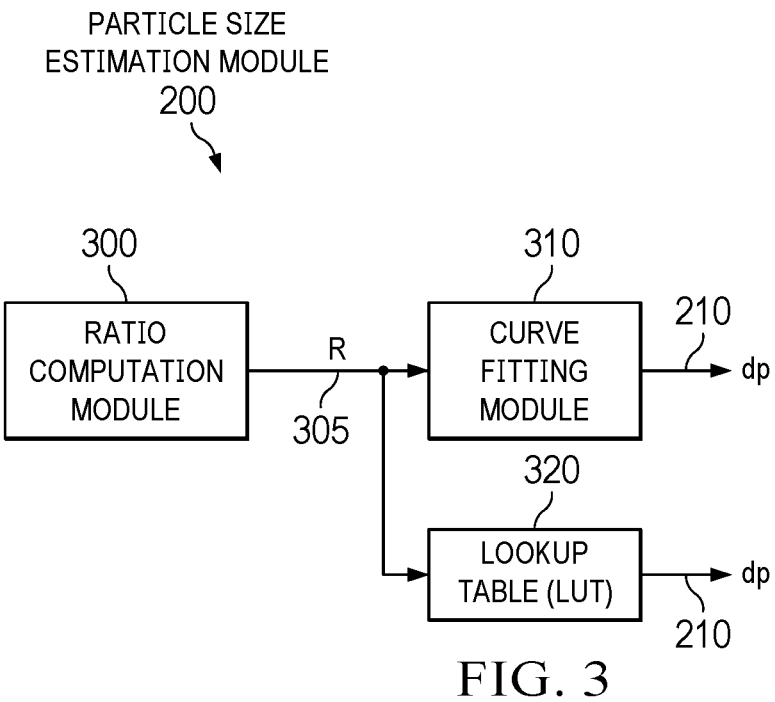
FIG. 3 is a block diagram of a particle size estimation module, in accordance with various examples.

FIG. 3 is a block diagram of a particle size estimation module 200, in accordance with various examples. Particle size estimation module 200 is shown to include a ratio computation module 300, a curve fitting module 310, and a lookup table 320.

Ratio computation module 300 is configured to compute the ratio R (also labelled 305 in FIG. 3) between the power or intensity ($I_0$) of detected backscattered light 145a and the power or intensity ($I_1$) of detected backscattered light 145b. In some examples, R may be computed as:

$$R = I_{0\_norm}/I_{1\_norm} \qquad \text{(Equation 2)}$$

where $I_{0\_norm}$ and $I_{1\_norm}$ are the normalized intensities (e.g., the intensity or power that is incident at the detection region of the light detector 110.). In some examples, R can also be computed based on a ratio between $I_0$ and $I_1$. The normalized intensities $I_{0\_norm}$ and $I_{1\_norm}$ (and intensities $I_0$ and $I_1$) are functions of the particle concentration $N(d_p)$, and the $N(d_p)$ factor can be removed in the ratio R, so that the ratio can be a function of the particle diameter $d_p$, and not a function of the particle concentration.

Curve fitting module 310 is configured to compute the average particle size $d_p$ as a function of R (for a particular set of wavelengths, e.g., blue/IR, green/IR, etc.) which exploits the monotonic relationship between the ratio and the average particle size, as described below in connection with FIG. 7. In some examples, the average particle size may be computed using polynomial curve fitting as:

$$d_p = p_0 + p_1 R + \cdots p_n R^n \qquad \text{(Equation 3)}$$

In Equation 3, $p_0$, $p_1$, . . . $p_n$ are coefficients of a polynomial that relates intensity ratios to average particle sizes. The polynomial coefficients may be determined through a calibration or simulation process in which intensity ratios are computed for a range of particles of known sizes and the resulting ratios are fitted to a curve described by the polynomial using linear regression, or any other suitable technique in light of the present disclosure. In some examples, the particle diameter $d_p$ can have a monotonic relationship with R.

In some examples, as an alternative to performing the curve fitting process for each measured ratio, a lookup table (LUT) 320 may be used to provide $d_p$ as a function of R (e.g., the LUT provides a mapping between intensity ratios and particle sizes). The values of $d_p$ stored in the LUT, which may be indexed by R, can be precomputed using curve fitting or by any other suitable means in light of the present disclosure.

In some examples, the LUT (or other hardware) can store a mapping between $d_p$ and ratios R from obtained from different wavelength combinations of backscattered light. For example, a first set of $d_p$ can be mapped to a first set of ratios R between intensities of backscattered blue light and infrared light, and a second set of $d_p$ can be mapped to a second set of ratios R between intensities of backscattered green light and infrared light, to provide monotonic relationships between $d_p$ and R. In such examples, air quality sensing system 100 may include multiple LEDs to provide blue light, green light, and infrared light to perform the air quality measurement.

The process described above can be performed by particle concentration computation module 230 and mass concentration computation module 250 and is summarized as follows:

Received scatter intensity $I(\overline{d})$ can be computed by particle concentration computation module 230, as an approximation, as follows:

$$I(\overline{d}) \approx N_{tot}(\overline{d}) \cdot I_0(\overline{d}) \qquad \text{(Equation 4)}$$

In Equation 4, $\overline{d}$ represents the average particle size, and $I_0(\overline{d})$ represents the expected scatter power or intensity 220 of a single particle of size $d_p$, as described above. $I_0(\overline{d})$ can be a known parameter from simulation. $N_{tot}(\overline{d})$ can be determined based on a ratio between received scatter intensity $I(\overline{d})$ and $I_0(\overline{d})$.

In some examples, to determine $N_{tot}(\overline{d})$, a calibration operation can be performed using a reference sensor (e.g., air quality sensing system 100) with particles of known concentration $N_{ref}$ and of known particle diameter (or average particle diameter), where the backscattered light intensities are measured as simulated light intensities $I_{SIM}$. $I_{SIM}$ can also be related to $N_{tot}(\overline{d})$ and $I_0(\overline{d})$ based on Equation 4 above. Different intensities $I_{SIM}$ can be generated for different particle diameters (or average particle diameters), and different $I_0(\overline{d})$ values can be determined from different intensities $I_{SIM}$ and the known concentrations $N_{ref}$ based on Equation 4. The different $I_0(\overline{d})$ values (and/or $I_{SIM}$ values) can be mapped to different particle diameters d in a storage (e.g., a lookup table).

To determine $N_{tot}(\overline{d})$, a simulated light intensity $I_{SIM}$, or $I_0(\overline{d})$, for a particular average particle diameter can be retrieved from the storage based on known particle diameter (determined based on R as described above). In some examples, a scaling factor k can be determined based on a ratio between $I_{SIM}$ and the measured backscattered light intensity ($I_0+I_1$) can be determined, and $N_{tot}(\overline{d})$ can be determined based on a ratio between the scaled measured backscattered light intensity ($I_0+I_1$) (scaled by k) and $I_0(\overline{d})$ based on Equation 4 above. In some examples, $N_{tot}(\overline{d})$ can also be determined based on a ratio between the measured backscattered light intensity ($I_0+I_1$) and $I_0(\overline{d})$. The $N_{tot}(\overline{d})$ and $\overline{d}$ values can then be provided to mass concentration computation module 250, which can compute the mass concentration m based on Equation 1 as described above.

FIG. 4 is a flow diagram of an air quality measurement method 400, in accordance with various examples. In some examples, the method 400 is implemented by the air quality sensing system 100 via one or more components of the air quality sensing system 100. The method 400 may be implemented to provide air quality measurements based on detection of two or more light signals having different wavelengths. In some examples, the method 400 is implemented as computer-executable instructions stored on a non-transitory computer readable medium. The computer-executable instructions are executable by a processor or processing circuit, such as the processing circuit 180, to cause the processor to perform the operations of the method 400.

At operation 410, a first light source transmits a first light signal having a first wavelength. In some examples, the first light source is an LED, and the first wavelength is in the infrared spectral region.

At operation 420, a second light source transmits a second light signal having a second wavelength, the second wavelength different from the first wavelength. In some examples, the second light source is an LED, and the second wavelength is in the blue spectral region.

At operation 430, a first detection signal, responsive to scattering of the first light signal by one or more particles, is generated by a light detector. In some examples, the light detector is a photodiode.

At operation 440, a second detection signal, responsive to scattering of the second light signal by one or more particles, is generated by the light detector At operation 450, a third signal, responsive to the first and second detection signals, is generated. The third signal is representative of an air quality measurement and may include one or more of size of the particles and mass concentration of the particles. As described above, the processing circuit may determine an intensity ratio between the first light signal and the second light signal, based on the first and second detection signals, and then determine the particle size and/or mass concentration based on the intensity ratio.

FIG. 5 is a flow diagram of another air quality measurement method 500, in accordance with various examples. In some examples, the method 500 is implemented by the air quality sensing system 100 via one or more components of the air quality sensing system 100. The method 500 may be implemented to provide air quality measurements based on detection of two or more light signals having different wavelengths. In some examples, the method 500 is implemented as computer-executable instructions stored on a non-transitory computer readable medium. The computer-executable instructions are executable by a processor or processing circuit, such as the processing circuit 180, to cause the processor to perform the operations of the method 500.

At operation 510, a first detection signal is received. The first detection signal represents detection of a first light signal having a first wavelength. In some examples, the first wavelength is in the infrared spectral region.

At operation 520, a second detection signal is received. The second detection signal represents detection of a second light signal having a second wavelength. In some examples, the second wavelength is in the blue spectral region.

At operation 530, a third signal is generated at the processing output. The third signal is representative of an air quality measurement and may include one or more of size of the particles and mass concentration of the particles. As described above, the processing circuit may determine an intensity ratio between the first light signal and the second light signal, based on the first and second detection signals, and then determine the particle size and/or mass concentration based on the intensity ratio.

FIG. 6 is a flow diagram of a process method 600 for determining a relationship between backscattered light intensities ratio of two LEDs (R) and particle diameter ($d_p$), and to determine forward and backward backscatter angle configurations for an air quality sensing system, in accordance with various examples. In some examples, the method 600 may be implemented by a system configured to determine a suitable forward backscatter angle and backward backscatter angle for use in configuring the geometric layout of the light sources and light detector of the air quality sensing system 100, as previously described. In such examples, the forward and backward scatter angles $\Phi_1$ and $\Phi_2$ are adjustable. In some examples, the method 600 is performed by a processor or a processing circuit, such as the processing circuit 180 or other processing circuits, as the processor/processing circuit executes computer-executable instructions stored on a non-transitory computer readable medium.

At operation 602, the processing circuit 180 can control the first and second light sources (e.g., light sources 120 and 130) to project, respectively, lights of a first wavelength and a second wavelength at different forward and backward backscatter angles to particles of different particle sizes.

Specifically, as part of operation 602, different forward backscatter angles $\Phi_1$ and backward backscatter angles $\Phi_2$ can be selected from a range of angles. In some examples, the angles are selected from a range of zero to 360 degrees in one degree steps or increments. Also, different particles sizes can be selected over a range of particle sizes/diameters ($d_p$). In some examples, particles size may range from 0.3 μm to 10 μm. For each combination of particular forward and backward backscatter angles, and a particular particle size, the processing circuit 180 can control the first and second light sources to project the lights of two wavelengths at the forward and backward backscatter angles to particles of the particle size according to that combination. Operation 602 can be repeated over different combinations of forward and backward backscatter angles and particle size.

At operation 604, for each combination of forward and backward backscatter angles and particle size, the processing circuit can determine a photodetector output (e.g., output of light detector 110). The photodetector output can represent the intensity of backscatter light received by the photodetector for a particular combination of forward and backward backscatter angles and particle size.

At operation 606, the processing circuit can determine, from the photodetector outputs, a first scatter power $P_1$ for the light of the first wavelength and a second scatter power $P_2$ for the light of the second wavelength for different particle sizes.

Specifically, each light source (e.g., LED) can have a radiant power profile that relates the radiant power of the light source to wavelength and angular displacement. The photodetector can also have a received power profile that relates the received power to wavelength and angular displacement. To determine scatter power $P_1$, the photodetector output (which represents the intensity of backscatter light) at each forward backscatter angle and particle size, can be scaled by scaling factors based on the radiant power and received power for a given angular displacement (based on the forward backscatter angle) and for a given particle size from the radiant power profile of the first LED and the received power profile of the photodetector. The scaled intensities can then be summed as scatter power $P_1$ for a particular particle size $d_p$.

Also, to determine scatter power $P_2$, the photodetector output at each backward backscatter angle and particle size, can be scaled by scaling factors based on the radiant power and received power for a given angular displacement (based on the backward backscatter angle) and for a given particle size from the radiant power profile of the second light source and the received power profile of the photodetector. The scaled intensities can then be summed as scatter power $P_2$ for that particular particle size $d_p$.

At operation 608, the processing circuit can compute a ratio R as $R(d_p)=P_1/P_2$, which is equivalent to the ratio of received intensities, for different particle sizes.

At operation 610, after $R(d_p)$ has been computed and stored for all particle sizes of interest, the processing circuit can determine a relationship between the ratios and the particle sizes. The processing circuit can perform a curve fitting, a linear regression operation, etc., to determine the relationship. An example curve fitting is illustrated in FIG. 7 which will be described below.

At operation 612, the processing circuit can determine a forward backscatter angle configuration and a backward backscatter angle configuration for an air quality sensing system based on the relationship.

Specifically, the processing circuit can determine, for each combination of forward and backward backscatter angles, a mean squared error (MSE) between the set of known particle sizes used in operations 602-606 and a set of particle sizes computed using the relationship and the R ratios for the particular combination of forward and backward backscatter angle. A particular combination of forward and backward backscatter angles that provide the minimum MSE, among all combinations, can then be selected as the forward backscatter angle configuration and the backward backscatter angle configuration for an air quality sensing system.

Figure 7:
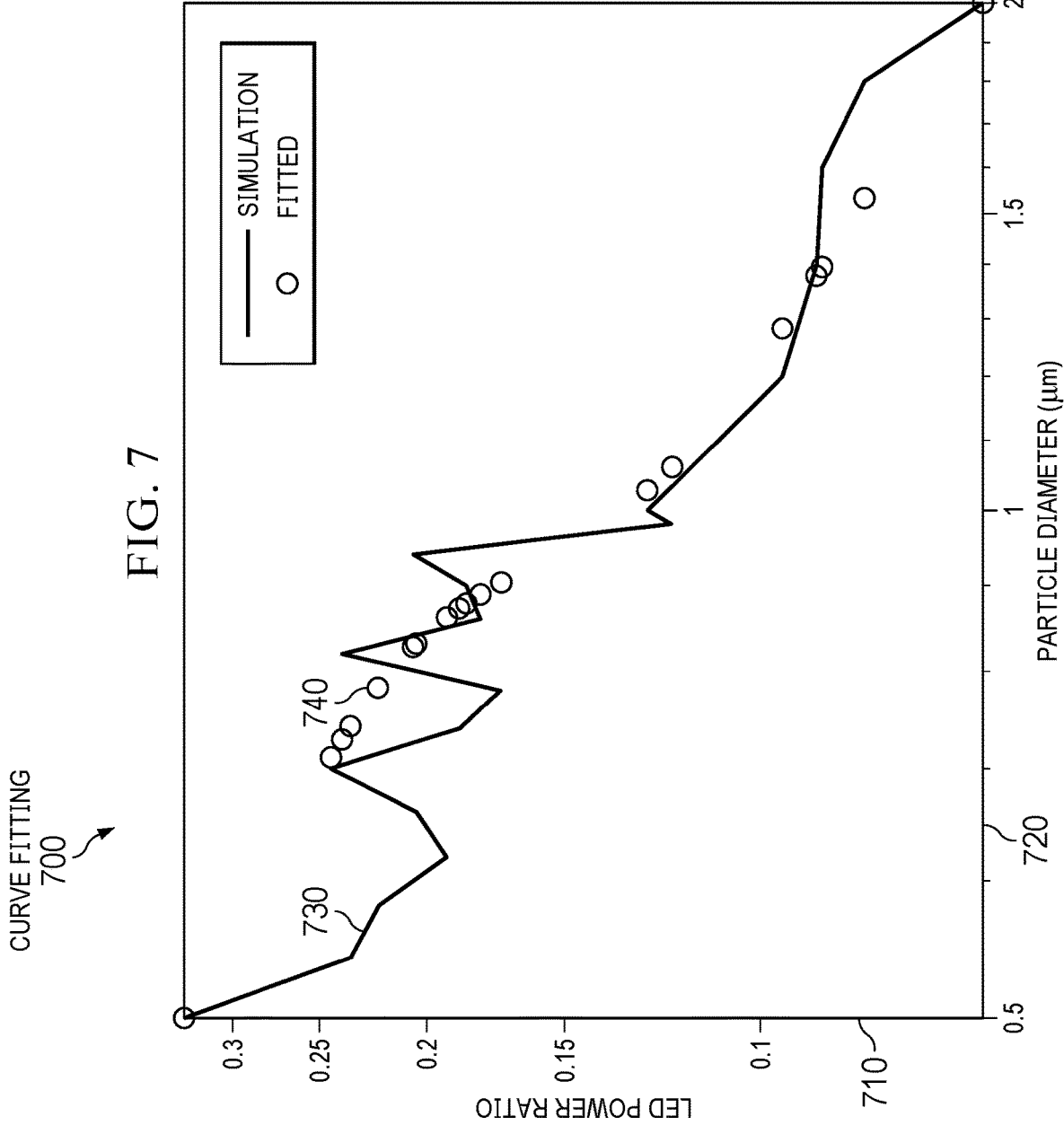
FIG. 7 includes a graph illustrating curve fitting used by an air quality sensing system, in accordance with various examples.

FIG. 7 includes a graph 700 illustrating curve fitting used by an air quality sensing system, in accordance with various examples. Referring to FIG. 7, the power ratio $R(d_p)$ 710, obtained by the simulation process described above, is plotted as line 730 as a function of particle diameter 720 expressed in μm. A curve is fitted to the line 740 at points 730. Any suitable curve fitting technique may be used to generate the fitted points, including for example, linear regression. In some examples, graph 710 can include the power ratios of light of different pairing of wavelengths for different parameter sizes. For example, for a first parameter size range, graph 710 can include the power ratios of blue light versus IR, and for a second parameter size range, graph 710 can include the power ratios green light versus IR, to extend a monotonic relationship between power ratio and particle size.

Figure 8:
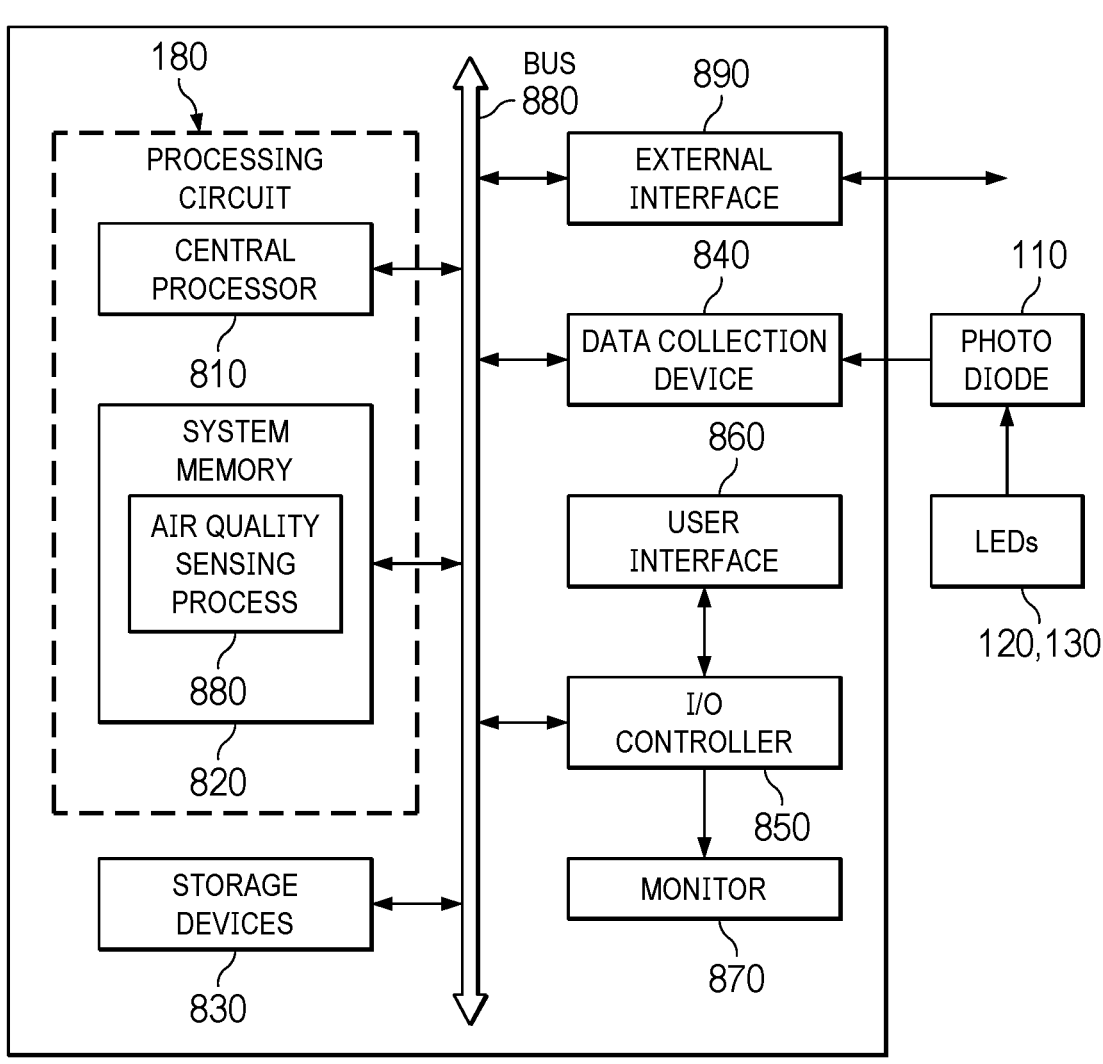
FIG. 8 is a block diagram of an example computing device that can perform an air quality measurement method, in accordance with various examples.

FIG. 8 is a block diagram of an example computing device or platform 800 that can be part of air quality sensing system 100. The hardware computing system 800 includes a number of example subsystems. The subsystems shown in FIG. 8 are interconnected via a system bus 880. Additional subsystems such as storage device(s) 830, a user interface 860, monitor 870, and others are shown. Peripherals and input/output (I/O) devices, which couple to I/O controller 850, can be connected to the hardware computing system by any number of means such as an input/output (I/O) port (e.g., Universal Serial Bus "USB," Fire Wire®). External interface 890 (e.g. Ethernet, Wi-Fi, etc.) can be used to connect hardware computing device 800 to a wide area network such as the Internet, a mouse input device, or a scanner. The interconnection via system bus 880 allows the central processor 810, which may be, or include, the processing circuit 180, to communicate with each subsystem and to control the execution of a plurality of instructions from system memory 820 or the storage device(s) 830 (e.g., a fixed disk, such as a hard drive, or optical disk), and the exchange of information between subsystems. The system memory 820 and/or the storage device(s) 830 may embody a computer-readable medium. In some examples, central processor 810 can execute instructions stored in system memory 820 and/or storage device(s) 830 to perform the example computations and methods described above with respect to any of the preceding drawings herein including processes 400, 500, and 600. The central processor 810 can use system memory 820 to store the input data, output data, as well as intermediary data generated from the performance of the method. Another subsystem is a data collection device 840, which may be configured to receive data from a light detector such as the light detector 110 of FIG. 1. Any of the data described herein can be output from one component to another component and can be provided to the user.

A hardware computing system can include the same components or subsystems, e.g., connected together by external interface 890 or by an internal interface. In some embodiments, hardware computing systems, subsystem, or apparatus can communicate over a network. In such instances, one computer can be a client and another computer a server, where each can be part of a same computer system. A client and a server can each include multiple systems, subsystems, or components.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

A device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof.

A circuit or device that is described herein as including certain components may instead be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be coupled to at least some of the passive elements and/or the sources to form the described structure either at a time of manufacture or after a time of manufacture, for example, by an end-user and/or a third-party.

While certain components may be described herein as being of a particular process technology, these components may be exchanged for components of other process technologies. Circuits described herein are reconfigurable to include the replaced components to provide functionality at least partially similar to functionality available prior to the component replacement. Components shown as resistors, unless otherwise stated, are generally representative of any one or more elements coupled in series and/or parallel to provide an amount of impedance represented by the shown resistor. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

Uses of the phrase "ground voltage potential" in the foregoing description include a chassis ground, an Earth ground, a floating ground, a virtual ground, a digital ground, a common ground, and/or any other form of ground connection applicable to, or suitable for, the teachings of this description. In this description, unless otherwise stated, "about," "approximately" or "substantially" preceding a parameter means being within +/−10 percent of that parameter. Modifications are possible in the described examples, and other examples are possible within the scope of the claims.

What is claimed is:

1. An apparatus comprising:
a first light source configurable to generate a first light signal having a first wavelength;
a second light source spaced from the first light source and configurable to generate a second light signal having a second wavelength, the second wavelength different from the first wavelength;
a light detector having a detector output, the light detector configurable to:
generate a first detection signal at the detector output responsive to the first light signal; and
generate a second detection signal at the detector output responsive to the second light signal; and
a processing circuit having a processing input and a processing output, the processing input coupled to the detector output, and the processing circuit configurable to generate a third signal representative of an air quality measurement at the processing output responsive to the first and second detection signals, wherein the third signal represents at least one of: a particle size or a mass concentration of particles.

2. The apparatus of claim 1, wherein the processing circuit is configurable to:
determine an intensity ratio between the first light signal and the second light signal received by the light detector based on the first and second detection signals; and
determine the particle size based on the intensity ratio.

3. The apparatus of claim 1, wherein the processing circuit is configurable to determine the particle size based on at least one of: a polynomial function that relates particle sizes and intensity ratios, or a mapping between particle sizes and intensity ratios.

4. The apparatus of claim 1, wherein the processing circuit is configurable to determine the mass concentration based on the particle size.

5. The apparatus of claim 1, wherein the processing circuit is configurable to:
determine a received intensity of at least one of the first or second light signals at the light detector based on at least one of the first or second detection signals;
determine an expected single particle scatter intensity of the at least one of the first or second light signals based on the particle size;
determine a particle concentration based on a ratio between the received intensity and the expected single particle scatter intensity; and
determine the mass concentration based on the particle concentration.

6. The apparatus of claim 1, wherein the first wavelength is in an infrared spectral region and the second wavelength is in a blue spectral region.

7. The apparatus of claim 1, wherein the first light source is configurable to project the first light signal at a first angle with respect to the light detector, and the second light source is configurable to project the second light signal at a second angle with respect to the light detector, such that the first light signal is backscattered at a third angle in a range of 50 to 60 degrees with respect to the projection of the first light signal by the first light source, and the second light source is backscattered at a fourth angle in a range of 145 to 155 degrees with respect to the projection of the second light signal by the second light source.

8. The apparatus of claim 1, wherein the processing circuit comprises a microcontroller unit (MCU) including a controller input and a controller output, the controller input being coupled to the processing input, and the controller output being coupled to the processing output, and wherein the MCU is configurable to: receive, at the controller input, the first and second detection signals; and provide, at the controller output, the third signal representative of the air quality measurement.

9. The apparatus of claim 1, wherein the first light source and the second light source are oriented at different angles with respect to the light detector.

10. An apparatus comprising:
a processing circuit having a processing input and a processing output and configurable to:
receive a first detection signal at the processing input, the first detection signal representing detection of a first light signal from a first light source, the first light signal having a first wavelength;
receive a second detection signal at the processing input, the second detection signal representing detection of a second light signal from a second light source spaced from the first light source, the second light signal having a second wavelength; and
generate a third signal representative of an air quality measurement at the processing output responsive to the first and second detection signals, wherein the third signal represents at least one of: a particle size or a mass concentration of particles.

11. The apparatus of claim 10, wherein the processing circuit is configurable to:
determine an intensity ratio between the first light signal and the second light signal based on the first and second detection signals;
determine the particle size based on the intensity ratio; and
determine the mass concentration based on the particle size.

12. The apparatus of claim 10, wherein the processing circuit is configurable to determine the particle size based on at least one of: a polynomial function that relates particle sizes and intensity ratios, or a mapping between particle sizes and intensity ratios.

13. The apparatus of claim 10, wherein the processing circuit is configurable to:
determine a received intensity of at least one of the first or second light signals based on at least one of the first or second detection signals;
determine an expected single particle scatter intensity of the at least one of the first or second light signals based on the particle size;
determine a particle concentration based on a ratio between the received intensity and the expected single particle scatter intensity; and
determine the mass concentration based on the particle concentration.

14. A method comprising:

transmitting, with a first light source, a first light signal having a first wavelength;

transmitting, with a second light source spaced from the first light source, a second light signal having a second wavelength different from the first wavelength;

generating, by a light detector, a first detection signal responsive to the first light signal;

generating, by the light detector, a second detection signal responsive to the second light signal; and generating, by a processing circuit, a third signal representative of an air quality measurement responsive to the first and second detection signals, wherein the third signal represents at least one of: a particle size or a mass concentration of particles.

15. The method of claim 14, further comprising:

determining an intensity ratio between the first light signal and the second light signal based on the first and second detection signals;

determining the particle size based on the intensity ratio; and determining the mass concentration based on the particle size.

16. The method of claim 14, further comprising determining the particle size based on at least one of: a polynomial function that relates particle sizes and intensity ratios, or a mapping between particle sizes and intensity ratios.

17. The method of claim 14, further comprising:

determining a received intensity of at least one of the first or second light signals based on at least one of the first or second detection signals;

determining an expected single particle scatter intensity of the at least one of the first or second light signals based on the particle size;

determining a particle concentration based on a ratio between the received intensity and the expected single particle scatter intensity; and determining the mass concentration based on the particle concentration.

18. A non-transitory computer readable medium storing instructions that, when executed by a processor, cause the processor to:

receive a first detection signal, the first detection signal representing detection of a first light signal from a first light source, the first light signal having a first wavelength;

receive a second detection signal, the second detection signal representing detection of a second light signal from a second light source spaced from the first light source, the second light signal having a second wavelength; and generate a third signal representative of an air quality measurement responsive to the first and second detection signals, wherein the third signal represents at least one of: a particle size or a mass concentration of particles.

19. The non-transitory computer readable medium of claim 18, wherein the instructions cause the processor to:

determine an intensity ratio between the first light signal and the second light signal based on the first and second detection signals;

determine the particle size based on the intensity ratio; and determine the mass concentration based on the particle size.

20. The non-transitory computer readable medium of claim 18, wherein the instructions cause the processor to determine the particle size based on at least one of: a polynomial function that relates particle sizes and intensity ratios, or a mapping between particle sizes and intensity ratios.

21. The non-transitory computer readable medium of claim 18, wherein the instructions cause the processor to:

determine a received intensity of at least one of the first or second light signals based on at least one of the first or second detection signals;

determine an expected single particle scatter intensity of the at least one of the first or second light signals based on the particle size;

determine a particle concentration based on a ratio between the received intensity and the expected single particle scatter intensity; and determine the mass concentration based on the particle concentration.

* * * * *